Oct. 3, 1939. B. F. MIESSNER ET AL Re. 21,225

APPARATUS FOR THE PRODUCTION OF MUSIC

Original Filed Dec. 1, 1933 3 Sheets-Sheet 1

INVENTORS:
Benjamin F. Miessner
Charles I. Jacobs

Oct. 3, 1939. B. F. MIESSNER ET AL Re. 21,225
APPARATUS FOR THE PRODUCTION OF MUSIC
Original Filed Dec. 1, 1933 3 Sheets-Sheet 2
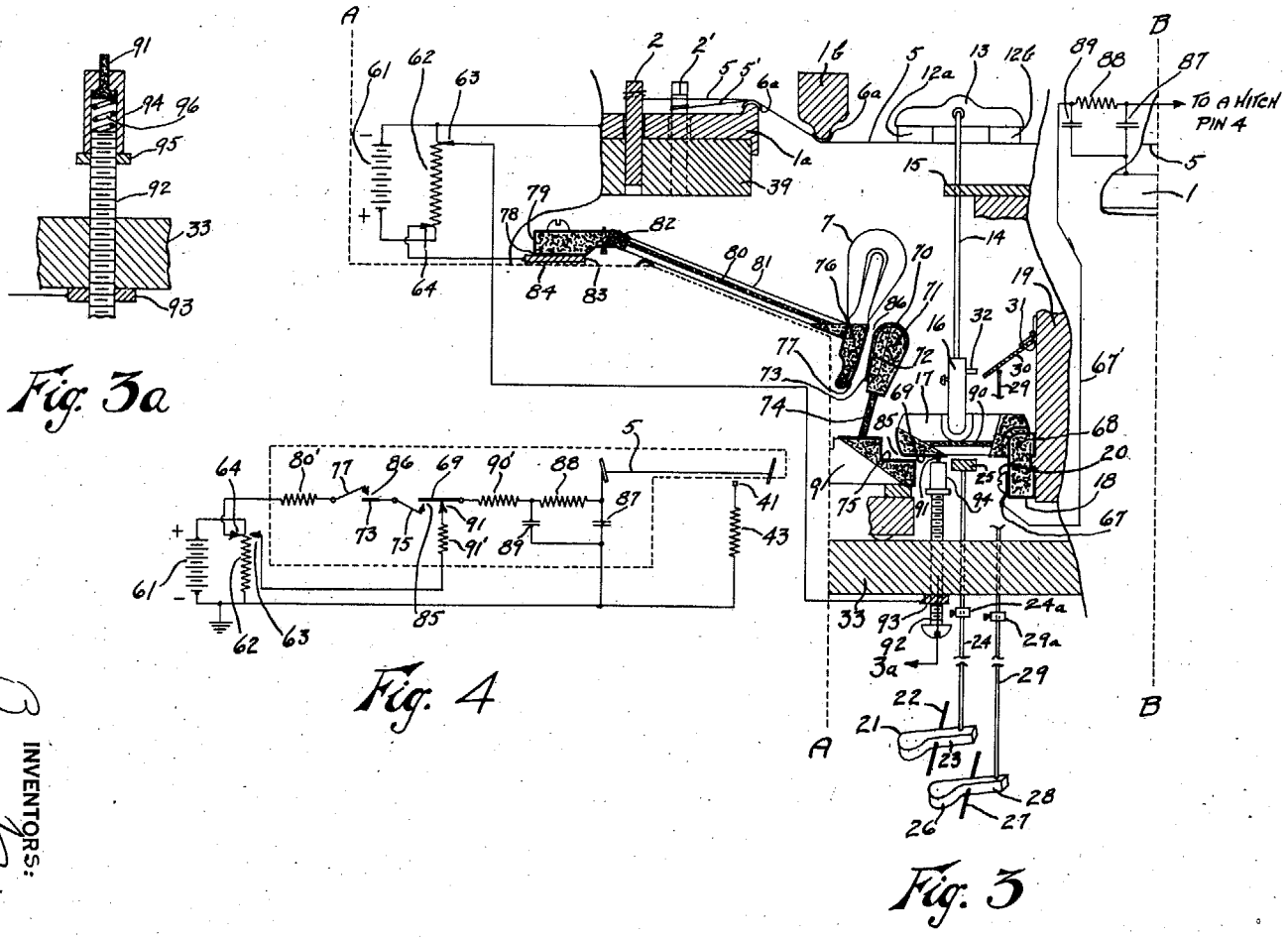
INVENTORS:
Benjamin F. Miessner
Charles I. Jacobs Oct. 3, 1939. B. F. MIESSNER ET AL Re. 21,225
APPARATUS FOR THE PRODUCTION OF MUSIC
Original Filed Dec. 1, 1933 3 Sheets-Sheet 3
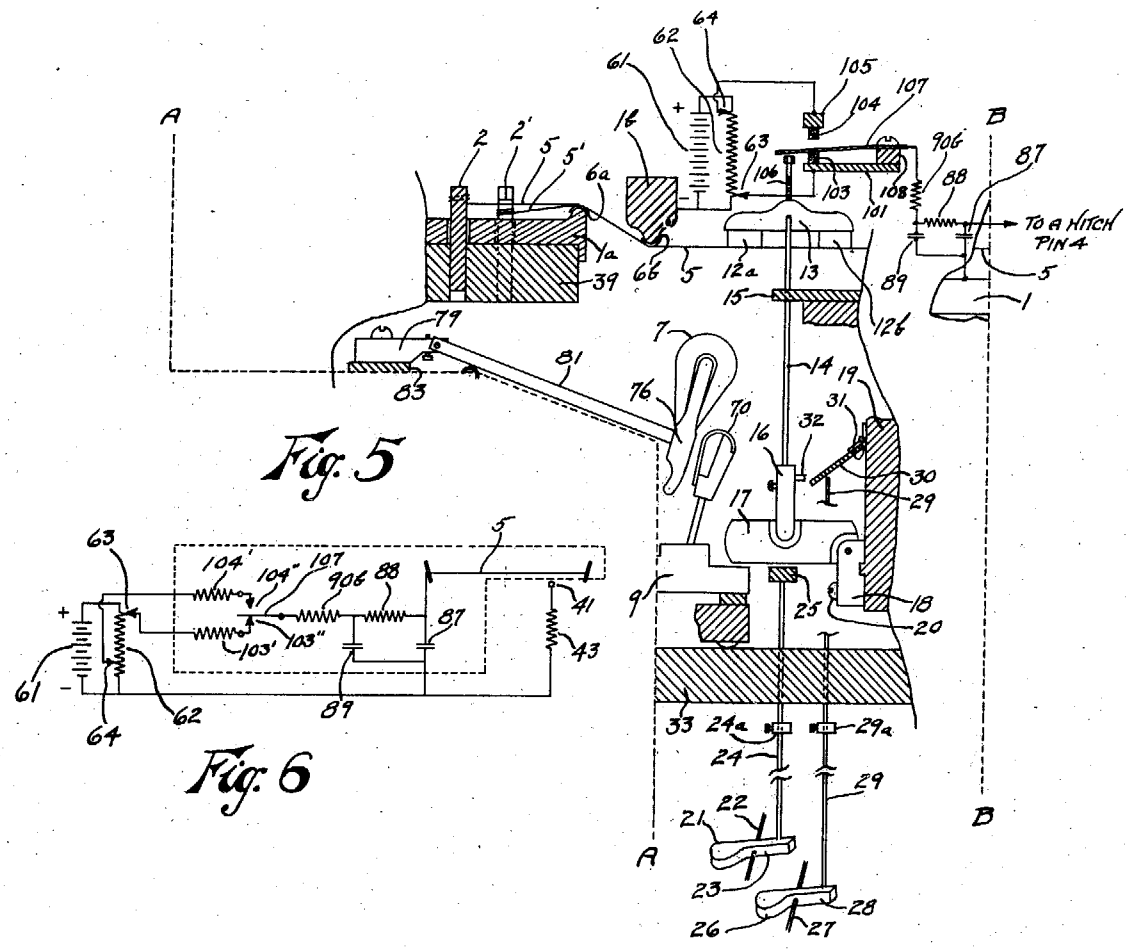
INVENTORS:
Benjamin F. Miessner
Charles I. Jacobs Reissued Oct. 3, 1939

Re. 21,225

UNITED STATES PATENT OFFICE 21,225

APPARATUS FOR THE PRODUCTION OF MUSIC

Benjamin F. Miessner, Millburn Township, Essex County, and Charles T. Jacobs, New Providence Township, Union County, N. J., assignors to Miessner Inventions, Inc., a corporation of New Jersey Original No. 2,071,649, dated February 23, 1937, Serial No. 700,396, December 1, 1933. Renewed October 10, 1936. Application for reissue November 3, 1938, Serial No. 239,708

23 Claims. (Cl. 84—1.13)

This invention relates to musical instruments, and has special reference to those in which the output sound is translated from the vibrations of a tuned vibrator or of a plurality of tuned vibrators.

In the U. S. Patent No. 1,915,859, issued to us June 27, 1933, there was shown and claimed an instrument wherein a mechanico-electric translating system associated with each vibrator, and adapted to translate vibrations thereof into electric oscillations which were in turn translated into sound, was maintained normally in a given condition of operativeness or of translation efficiency, and was caused gradually (as distinguished from abruptly) to assume another condition or efficiency upon the inception of vibration of the associated vibrator. If for example the first mentioned efficiency was of zero value and the second of finite value, the oscillations produced by the translation of vibration would give rise upon their translation into sound to a tone simulating that of a wind or similar instrument, even though the inception of the vibration were abrupt. This invention contemplates particularly instruments wherein this and similar arrangements are incorporated.

In the mentioned patent the instrument to which the described arrangements were applied was a piano. Therein the mechanico-electric translating system associated with the string (or strings) for each different note was caused to assume the second mentioned efficiency just after impact of the hammer with such string, and to retain this second efficiency only as long as the associated key remained depressed. Therefore the conventional "loud" (more aptly and hereinafter termed "sustaining") pedal and the conventional "sostenuto" pedal, although available to maintain the string in vibration after associated key release, were not operative to maintain the efficiency at the second value, the efficiency returning to its first value promptly upon key release. Thus in the mentioned example an output tone could not be prolonged by either pedal after key release.

It is an important object of the instant invention to provide in an instrument of the piano type, modifications of the arrangements shown in the mentioned patent whereby the sustaining and sostenuto pedals will be rendered fully effective to perform their usual functions.

It is a broad object to provide a generally improved instrument whereby there are produced output tones having inceptions of nature modified from that of the inception of the vibrations from which said tones are translated.

In the mentioned patent electric circuits with suitable switches included therein were employed in the control of the mechanico-electric translation efficiency, and it is a particular object of the instant invention to provide improved such circuits. Another particular object is the provision of such circuits in convenient and compact association with the conventional parts of a piano.

Other and allied objects will more fully appear from the following description and the appended claims.

In the description reference is had to the accompanying drawings, of which:

Figure 3 is a view of similar nature to the main portion of Figure 1, but illustrating a modified embodiment of the invention;

Figures 1, 2:
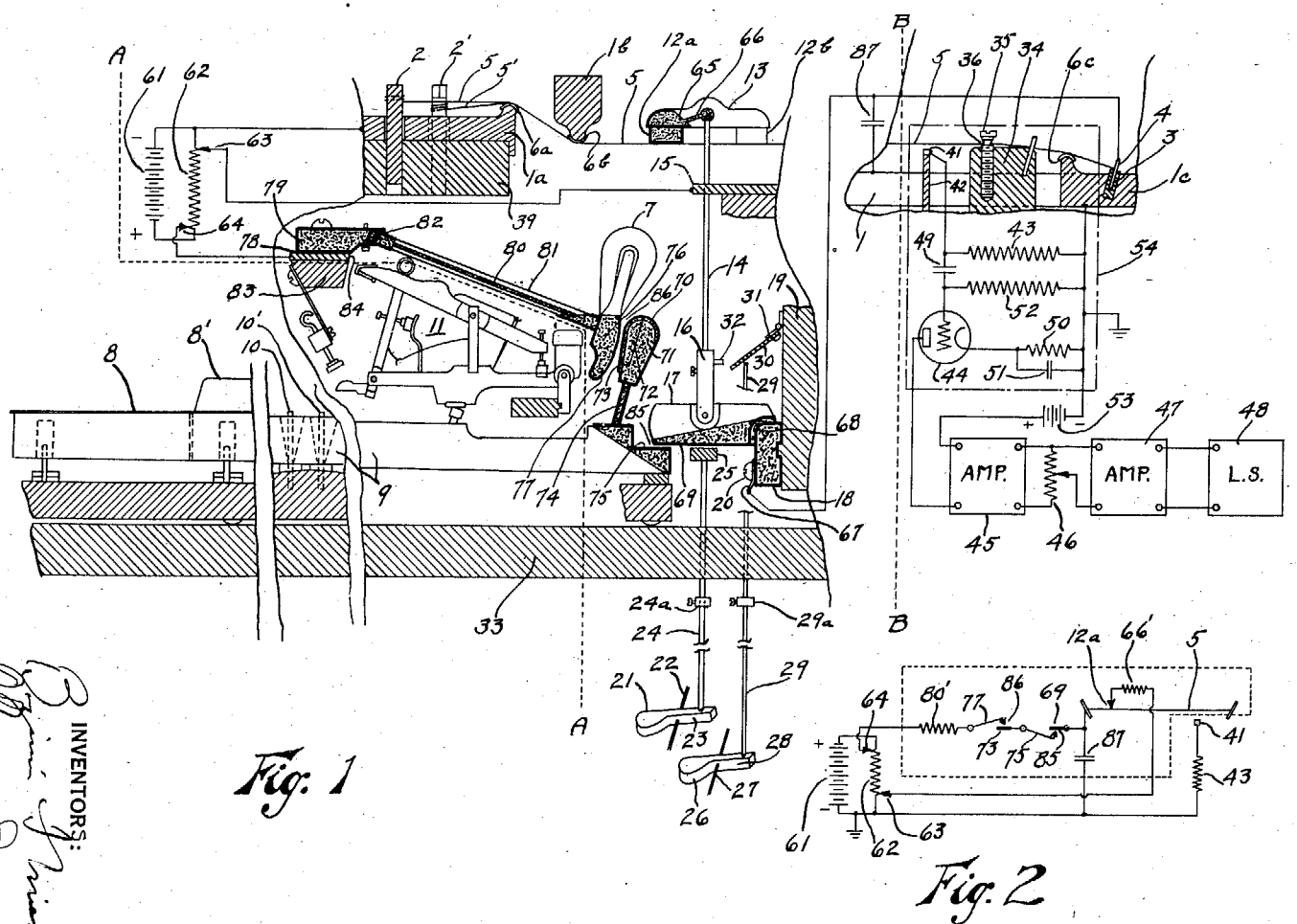
Figure 1 is a vertical cross-sectional view through a portion of an instrument of the grand piano type, illustrating an embodiment of the invention, this figure showing partially diagrammatically the mechanico-electric and electro-acoustic translating apparatus.
Figure 2 is a schematic diagram of the electrical circuit of the main portion of Figure 1.

Figure 3*a* is a cross-sectional view taken along the line 3*a* of Figure 3 and illustrating in detail a portion of that figure;

Figure 4 is a schematic diagram of the electrical circuit of Figure 3;

Figure 5 is a view of similar nature to the main portion of Figure 1, but illustrating a further modified embodiment of the invention; and Figure 6 is a schematic diagram of the electrical circuit of Figure 5.

Reference being directed particularly to Figure 1, there will be seen a typical piano plate or metallic frame 1, having front portion 1*a*, capo portion 1*b* and rear portion 1*c*, these portions appearing in cross-section. Intermediate portions of the frame are only fractionally shown in order to avoid complication of the figure, but it will be understood that all portions of the frame are mechanically and electrically integral or mutually connected. Secured underneath the front frame portion 1*a* is shown a wrest-plank 39, in which may be retained tuning pins 2 which do not contact with the frame. In the rear frame portion 1*c* may be secured insulating bushings 3 and therein respectively hitch pins 4. From each tuning pin, under capo or frame portion 1*b*, over a bridge 34 and to a respective hitch-pin is strung a string 5. Along the top rear edge of frame portion 1*a*, the bottom of capo or frame portion 1b, and the top front edge of frame portion 1c may be provided Bakelite or other insulating strips 6a, 6b and 6c respectively, in order that each string may be completely insulated from the frame 1.

All the strings 5 may lie in the same horizontal plane; therefore there appears in the figure the main portion of, and the apparatus associated with, a single string only. The contemplation of a plurality of strings, however, is indicated by the additional illustration of a particular other tuning pin 2' and of the front portion of a particular other string 5' strung to tuning pin 2'.

Each string is excitable by an individual hammer 7, having hammer tail 76, shank 81, stationary flange 79, and metallic pin 82 pivoting the shank to the flange. For operating the hammers are provided keys 8, each having a horizontal rearward extension 9 pivoted as at 10; a particular other key, adjacent for example to the one principally appearing in the figure, has been designated as 8' and its pivot as 10' by way of illustration. Each key 8 is operatively connected with a respective hammer through an individual piano action mechanism 11 interposed between the key extension 9 and the hammer shank 81. To the rear of each extension 9 is secured, as by rod 74, a back-check 70 having wooden body 71, leather facing 73, and felt 72 interposed between body and facing. The parts as described in this paragraph are conventional. It will therefore be understood that upon depression of any key 8 its associated hammer 7 will be propelled toward and caused to strike the associated string 5, immediately rebounding therefrom; and that, unless the key manipulation be of an extreme "staccato" nature, the hammer tail 76 upon the rebound will be driven into contact with and will frictionally engage the leather facing 73 of the then-raised back-check 70, and will maintain this engagement until release of the key 8.

Normally resting on each string and damping the same to prevent appreciable vibration thereof is provided an individual damper 13 including the damping pads 12a and 12b. Each damper is carried at the top of a metallic damper rod 14 which passes through common guide rail 15 and is terminally secured to a damper bushing 16. This bushing is pivoted to damper lever 17; and the lever 17 is pivoted by metallic pin 68 to damper flange 18, which is secured to a common rigid portion 19 as by screw 20. The forward end of the bottom surface 69 of each damper lever 17 is very slightly spaced above the rear upper surface 75 of the extension 9 of the associated key 8, and is therefore adapted to be lifted upon and throughout depression of that key. This obviously lifts the damper 13 from and thus de-damps the associated string throughout the period of key depression. The parts described in this paragraph also will be recognized as entirely conventional elements of the grand piano.

Pedals of the conventional "sustaining" and "sostenuto" types are schematically illustrated as 21 and 26, respectively, pivoted as at 22 and 27. The pedals are provided with rearward extensions 23 and 28, respectively, and to these extensions are terminally connected rods 24 and 29, respectively, each rod being raised by depression of the associated pedal. Both rods may pass through rigid base 33. Connected to the top of rod 24 is shown bar 25, this bar passing under all of the damper levers 17 so that upon depression of the sustaining pedal 21 all the damper levers will be lifted and all the strings de-damped. The top of rod 29 is connected to a strip 30 hinged along its edge 31 to rigid portion 19, so that upon depression of the sostenuto pedal 26 the strip 30 will be swung about its edge 31 in a clockwise direction as illustrated. On the back of each damper bushing 16 is provided a small horizontal tongue 32; this is normally disposed outside the sector of swing of the strip 30. If, however, any key 8 be already depressed and the associated damper bushing 17 therefore be in a raised position when pedal 26 is depressed, the tongue 32 on that bushing will be engaged by the upward swing of strip 30 and will be held raised, together with the associated damper 13, after release of that key and as long as pedal 26 is maintained depressed. It is convenient to consider the sustaining pedal 21 as lifting the damper 13 to a slightly lower position, and to consider the sostenuto pedal 26 as lifting those dampers whose tongues it may engage to a slightly higher position, than that maintained by complete key depression. That the action of the pedals may be so limited there have been shown collars 24a and 29a adjustably secured to rods 24 and 29, respectively, and adapted to impinge upon the bottom of base 33. It will be understood that these particular sustaining and sostenuto pedal arrangements are functionally identical with those conventionally included in the grand piano, and are shown constructionally simplified or modified therefrom only in the interest of simple illustration.

In general in Figure 1 (as well as in similar succeeding figures) there are shown in section only mechanical parts common in function to the several strings and to the therewith associated striking and damping systems; and conversely all such common mechanical parts have been shown in section excepting the pedal system portions 21—22—23—24—24a and 26—27—28—29—29a.

In Figure 1 there is also shown the mechanico-electric translating system. This includes a conductive strip 41 of small cross-section, which may be cemented to the top of a thin Bakelite or other insulating strip 42 and thereby maintained in slight spaced relationship to all of the strings. The spacing of strip 41 from the several strings is in general just sufficient to avoid contact of strip and string under a condition of maximum vibration of the latter; and these individual spacings are conveniently adjusted by slight up-and-down adjustment of the rear string extremity, as by an individual screw 35 having an annular groove 36 engaging the associated string. A high resistance 43 may connect the strip 41 to the frame 1, which is in an electrical sense hereinafter frequently referred to as "ground". Means supplying variable D. C. potentials and hereinafter described is provided between ground and each string; and it will be understood that by this means the minute capacity between strip 41 and each string is charged through resistance 43. The value of resistance 43 is preferably made high enough to render the charge in each such capacity relatively incapable of rapid variation—i. e., of oscillation variation at a frequency as high as that of string vibration. Therefore oscillatory variation of any of these capacities, produced as by vibration of the associated string, in turn produces an oscillatory voltage component across the capacity. This component is applied through the potential supplying means, which has a low impedance to alternating currents, to the resistance 43 and appears as an A. C. voltage thereacross.

Across the terminals of resistance 43 may be connected an electrical amplifying and electro-acoustic translating system for amplifying and translating into sound such A. C. voltages. This system has been shown as comprising in cascade an amplifying tube 44 and associated circuit, amplifier 45, potentiometer or volume control 46, further amplifier 47, and loudspeaker 48. The circuit associated with tube 44 may comprise a condenser 49 connected between the tube grid and the strip connected extremity of resistance 43; a small bias resistance 50, by-passed by a condenser 51, connected from the tube cathode to the ground extremity of resistance 43; a grid leak 52 connected from the grid of the tube to ground; and an anode circuit connected from the anode of the tube to ground, serially including the input circuit of amplifier 45 and the anode current source 53. To reduce the sensitivity of portions of the apparatus to stray electrostatic fields there has been schematically shown electrostatic shielding 54, at frame or ground potential, surrounding the strip 41, the resistance 43, the condenser 49, the grid leak 52 and tube 44.

The illustrated embodiments of the invention are intimately concerned with the above mentioned means for supplying variable D. C. potentials between ground and each string—or in other words for controlling the potential of each string with respect to ground. In introduction to the description of these embodiments themselves it is appropriate to point out that upon string vibration the amplitude of the A. C. voltage across resistance 43, and hence the output sound produced by loudspeaker 5 (excepting as deliberately modified by volume control 46) is proportional not only to the amplitude of string vibration but also to that of the charge in the string-to-strip 41 capacity, and hence to the mean D. C. potential across that capacity. Therefore by control of this mean potential it may be said that there is controlled the translation efficiency of the mechanico-electric translating system, and more generically that of the mechanico-electro-acoustic translating system. A zero translation efficiency, an absence of A. C. voltage across resistance 43, and an absence of sound from loudspeaker 48 are the results of a lack of such potential; while a finite such efficiency and (a string being vibrated) a finite such voltage and sound each result from the existance of such mean potential, and are each proportional to its amplitude. This mean potential across each string-to-strip 41 capacity is identical (excepting for a time lag unnoticeable by the ear and resulting from the time constant of string-to-strip capacity with resistance 43) with the potential of that string with respect to ground. The control of string potential with respect to ground will therefore be understood to be in more generic terms the control of the translation efficiency.

The variation of this potential of each string is contemplated as taking place in particular time relation to the operation of the vibration controlling means associated with that string—e. g., of the vibration-initiating hammer 7 and the vibration-terminating damper 13. In the issued patent abovementioned a potential of normal value was ordinarily supplied; this was gradually changed to a modified value upon associated key depression, or in other words upon the initiation of a cyclic digital operation comprising key depression and subsequent release; and was restored to its normal value upon the completion of the cyclic operation (i. e., upon release of the key). According to the instant invention a potential of a normal value is again ordinarily supplied and is again gradually changed to a modified value by the initiation of the cyclic digital operation; but it is not necessarily restored to its normal value upon completion of that operation, but is therethrough and thereafter maintained at its modified value at will by selectively operable means, specifically pedals 21 and 26. The relative normal and modified values of potential may be varied according to the nature of output tone or sound which it is desired to produce. Attention is hereinafter called to several particular relations of these values adapted to produce a like number of particular sound natures.

In the various illustrated embodiments of this invention the means for controlling the potential of each string may be conveniently considered as comprising a common source of potentials; an individual reactive system associated with each string for rendering relatively gradual all changes of string potential; an individual "normalizing" circuit connected to each reactive system from a common point in the source and closed throughout substantial contact with the associated string of the associated damper; and a "modifying" circuit connected to each reactive system from another common point in the source and closed throughout depression of the associated key. In each figure the common source is shown as a battery 61 having one of its terminals—the negative by way of illustration only—connected to ground by connection thereof to some portion of the frame 1, and being shunted by a potentiometer 62 having movable contacts 63 and 64. At these two contacts may respectively terminate the normalizing circuits for all strings and the modifying circuits for all strings. These circuits themselves and the reactive systems, being shown as respectively different in different embodiments, are described separately for each of the Figures 1, 3 and 5.

The reactive system associated with each string in Figure 1 is simply the condenser 87, an individual such condenser being connected from each string 5 to ground—i. e., to frame 1. The associated normalizing and modifying circuits, being connected to the ungrounded side of this condenser, are thus in this particular embodiment also directly connected to the string; but it is convenient to consider the potentials supplied by these circuits as supplied to the reactive system and therefrom to the string.

In Figure 1 the normalizing circuit for each string is provided as follows: The forward portion of the damper 13 for each string, including the damping pad 12a, is rendered electrically conductive by impregnation with a colloidial graphite solution or emulsion. This impregnation may be effected by a dipping and drying process or a plurality of repeated such processes. A purely surface impregnation of the solid and customarily wooden portion of the damper is sufficient; and while it is possible to illustrate only a surface impregnation of the damping pad itself, it is to be understood that as to this part the impregnation is contemplated as desirably extending somewhat interiorly of the pad. This pad is usually of wool felt; and a graphite solution or emulsion whose vehicle is largely ammonia has been found to be particularly suited for the proper impregnation of such material as well as entirely satisfactory for other material. In the figures the impregnation of surfaces appearing in elevation has been denoted by the covering of such surfaces with small dots, or with stippling; and the impregnation of surfaces appearing only as edges has been denoted by the showing of such edges as heavy instead of normal lines. After impregnation the damper 13 will be understood to offer to electrical potentials between the string and the rear edge 65 of the impregnated portion a finite resistance which is the lower the stronger be the impregnation of the portion as established by strength of impregnating solution, duration of the impregnation process, number of times of repetition of the process, etc. There is contemplated no precise value of this resistance, but it is preferably relatively low compared with the value of the resistance element next described. This may take the form of a relatively thin strip 66 of resistive material, joining the edge 65 with the damper rod 14. It may be produced by painting on the side of the damper with a relatively weak solution of the impregnating material mentioned above or provided in any other convenient manner. The damper guide rail 15 through which all the damper rods 14 pass is intended in this embodiment always to make electrical contact with the damper rods and is formed of metal or other electrically conductive material. Finally this guide rail is electrically connected to the contact 63. The normalizing circuit for each string as thus described most obviously meets the specification that it be completed throughout substantial contact with the string of the associated damper.

In Figure 1 the modifying circuit for each string is provided as follows: The ungrounded side of each reactive system or condenser 87 is wired to a lug 67 retained under the screw 0 which secures the associated damper flange 18 to the rigid portion 19. Each assembly of damper flange 18 and damper lever 17 is rendered serially conductive from the surface contacting with lug 67 to the bottom surface 69 of the lever 17 by impregnation, as above described, of appropriate portions of the assembly including that surrounding the pivot pin 68. The rear portion of each key extension 9 together with the thereto secured back check 70 are similarly impregnated to provide a conductive path from the surface 75 to the leather facing 73. Next a conductive path is provided from the rear surface 77 of the hammer tail 76 to the bottom surface 78 of the hammer flange 79. This path may intermediately include the strip 80 of resistive material (conveniently produced as suggested for the resistive strip 66) on the hammer shank 81; and its terminal portions may be respectively provided by impregnating the entire hammer tail 76 together with the immediately adjacent portion of the shank 81 and impregnating the hammer flange 79 together with the immediately adjacent portion of the thereto pivotally assembly shank 81. Finally at least the top portion 84 of the hammer flange rail 83, with which portion the surfaces 78 of all the flanges 79 make contact, may be made of metal or other electrically conductive material and connected to the potentiometer contact 64. The impregnated portions of each modifying circuit as thus described are preferably sufficiently impregnated so that the total value of resistance of each, serially considered, is low compared to the resistance value of the strip 80 included in each circuit. Normally and as illustrated each modifying circuit is open, as surfaces 69 and 75 are not in contact with each other, and as surface 77 does not contact with facing 73. These respective portions do contact, however, at times hereinafter described; and it is therefore convenient to consider the surfaces 69 and 75 as forming the elements of a normally open switch 85, and the surface 77 and facing 73 as the elements of a normally open switch 86.

For convenience in consideration thereof, the circuit of Figure 1 has been condensed in Figure 2. Herein appears a string 5; the translating system portions 41—43; the potential source 61—62—63—64; a reactive system comprising condenser 87; a normalizing circuit including the damping pad 12a, schematically shown, and a resistance 66′, representing the total series resistance of the normalizing circuit and preferably principally made up of the resistance strip 66; and a modifying circuit including switches 85 and 86 (respectively comprising surfaces 75—69 and surface and facing 77—73) and the resistance 80′, representing the total series resistance of the modifying circuit with switches closed and preferably principally made up of the resistance of strip 80. The portions individual to a single string have been enclosed within a dotted line, and portions common to all the strings appear therewithout.

With the key 8 associated with a given string 5 in normal or raised position, the normalizing circuit associated with that string has been seen to be closed. The associated modifying circuit, however, is then open by virtue of the open condition of both switches 85 and 86. The given string 5 has the potential of contact 63, or its normal potential, with respect to ground. Dur- a downward movement of the associated key 8, however, the associated switch 85 closes; and the associated damping pad 12a is lifted off the string, opening the associated normalizing circuit. The associated switch 86 is still open, however, as is consequently the modifying circuit containing it, and the string is therefore still without urge to change its previously existing normal potential. But almost immediately thereafter the associated hammer 7 strikes the string, rebounds, and effectively closes the switch 86 and hence the modifying circuit. The potential of contact 64—the modified potential for the string—is then presented through the modifying circuit to the reactive system 87. The capacity comprised in the reactive system requires time to change its charge through the resistance 80 of the modifying circuit, and this causes the string to assume the modified potential gradually rather than abruptly.

It will be appreciated that as long as the key remains depressed, and therefore the modifying circuit closed and the normalizing circuit open, the string will be positively influenced to retain its modified potential.

During the first portion of the upward movement of the key 8 attendant upon key release the associated switch 86 is opened, action mechanism 11 being conventionally arranged to move the hammer tail 76 out of contact with the backcheck 70 at this time. This opens the modifying circuit (the later opening of its switch 85 being therefore immaterial). Until just before the completion of the upward movement of the key the contact of damper with string is of course prevented and the normalizing circuit is therefore maintained in an open condition. As long as this condition exists, for whatever cause, the string is without influence to change its potential from the modified value, which it therefore retains in spite of the opening of the modifying circuit. And this condition may be maintained at will by the appropriate use of either pedal, which will be understood to hold the damper out of contact with the string throughout and after key release. When the damper is again brought into contact with the string, whether upon key release or upon the completion of a pedalling operation, the normal potential will be again presented to the reactive system; the time required by the reactive system to change its charge through the resistance 66' of the normalizing circuit causing the string to assume the normal potential gradually rather than abruptly.

Typical, but in no sense restrictive, appropriate values of the resistance strips 80 and 66 and of condenser 87 in Figure 1 may be assigned as 3 to 4 megohms, ½ to 1 megohm, and .05 to .1 microfarad, respectively. It will be understood that the two resistances 80 and 66, each considered in connection with the condenser 87, are the determinants of the rate of assumption by the string of the modified and normal values of potential, respectively, when these potentials are presented to the reactive system. The lower the value of either resistance the more rapid will be the corresponding such rate, while the lower the value of the capacity the more rapid will be both such rates. If either rate be made too rapid some extraneous noises may be produced by the loudspeaker upon the closing of either modifying or normalizing circuit; but in general a somewhat lower value of 66 than of 80 has been found permissible, as well as desirable in order that the re-assumption of normal potential value by the string may take place at a rapid rate.

In Figure 1 there have been included two dotted lines A—A and B—B. In further embodiments of the invention the apparatus illustrated in Figure 1 to the left of line A—A and to the right of the line B—B may be employed without change; and therefore in Figures 3 and 5, illustrating these further embodiments, only the instrument portion included between these two lines has been shown. Even in this illustrated portion much of the instruments of each of Figures 3 and 5 remains identical with that of Figure 1, and the description of these figures assumes this identity of parts similarly shown and not specially described. With this in mind reference is directed to Figure 3. The essential points of difference of the instrument of Figure 3 from that of Figure 1 are the elaboration of the reactive systems for the most positive elimination of the mentioned extraneous noises without as definite a restriction of choice of string potential change rates; and the re-arrangement of the normalizing circuits, including the arrangement of a portion of each co-extensively with a portion of the associated modifying circuit.

Each reactive system in Figure 3 includes not only the condenser 87 connected from string to ground, but also the resistance 88 having one extremity connected to the string, and a condenser 89 connected from the second extremity of the resistance 88 to ground. The associated normalizing and modifying circuits are connected as by the lead 67' to this second extremity from the lug 67.

The co-extensive portion of mutually associated normalizing and modifying circuits comprises a serially conductive path, provided in general as in the modifying circuits of Figure 1, from the surface of damper flange 18 contacting with lug 67 to the bottom surface 69 of the damper lever 17. There may be optionally included in this path, however, a resistance strip 90, painted for example on the side of lever 17. The balance of each modifying circuit is provided identically as in Figure 1.

The balance of each normalizing circuit may be described as follows: Below the bottom surface 69 of each damper lever 17 is provided an individual carbon or other contact member 91, this being arranged to contact with an impregnated portion of the associated surface 69 only when the associated damper 13 is in substantial contact with its string. Each contact member 91 is permanently connected to the contact 63 of the potentiometer 62. In Figure 3, and more detailedly in the cross-sectional Figure 3a, there is shown an arrangement for supporting a contact member 91 to make the desired contact without significantly interfering with the customarily desired positive mechanical seating of the associated damper on its string. Thus an individual long metallic screw 92 is threaded through the base 33 under each damper lever 17 and through a common conductive member 93. Partially threaded into the upper end of each screw is an inverted cup member 94, and the carbon or other contact member 91 is made in the form of a button of inverted T-section protruding through a suitable aperture in the top of cup member 94. A coil spring 96 may bias the contact member 91 to its upmost position. This bias may be adjusted to the weakest dependable value by rotation of the cup member 94 with respect to the screw 92, and this adjustment locked as by lock nut 95. Each entire assembly may be adjusted, just dependably to contact with the associated surface 69 when the associated damper contacts with its string, from underneath the base 33 by rotation of the screw 92. The common conductive member 93 is wired to the potentiometer contact 63.

The circuit of Figure 3, condensed as was that of Figure 1 in Figure 2, is presented in Figure 4. Herein appear a reactive system 89—88—87; a resistance 90' which may represent the total series resistance of the co-extensive portion of mutually associated normalizing and modifying circuits; the balance of a normalizing circuit comprising the contact member 91 normally contacting with the surface 69 and a resistance 91' which may represent the normal resistance from the surface 69 through the contact member 91 to its supporting means; and the balance of a modifying circuit comprising as before the switches 85 and 86 and the resistance 80', representing the total series resistance of this balance of the modifying circuit with switches closed.

As before with the key 8 associated with a given string 5 in a normal or raised position, the normalizing circuit associated with that string is obviously closed, the associated modifying circuit open, and the string at its normal potential. During a downward movement of the key the associated switch 85 closes and the associated surface 69 is moved upwardly out of contact with its contact member 91, opening the normalizing circuit. The associated modifying circuit is not closed, however, until the switch 86 therein closes; then the modified potential is presented to the associated reactive system 89—88—87. By virtue of the time required for the charge in the condensers to change through the resistances 80′ and 90′ and additionally for that in condenser 87 to change through resistance 88, the assumption by the string of the modified potential is again gradual. Again as long as the key remains depressed the normalizing circuit remains open and the modifying circuit closed and the string is positively influenced to retain its modified potential. And the action of the circuit upon key and/or pedal release is quite similar to that above described for Figures 1–2, it being appreciated that the switch 86 will always open before the normalizing circuit is closed by contact of surface 69 with the contact member 91.

As in the case of Figure 1, the impregnation of various circuit portions is preferably such as to result in serial resistance values, excluding those of the localized resistances 80, 90 and 88, which are low compared to those of the localized resistances. Typical, but again not restrictive, appropriate values of the circuit components for Figure 3 may be assigned as 1 to 2 megohms for the total value of 80 and 90, serially considered; ½ to 1 megohm for the total value of 91′ and 90; 1 to 2 megohms for the value of 88; and .01 to .02 microfarad for the value of each of condensers 87 and 89. As mentioned above resistance 90 may be omitted (i. e., theoretically short circuited); it is included in Figure 3 principally so that a high resistance for 91′ may be avoided if desired.

In both the embodiments of Figures 1 and 3 the normalizing and modifying circuits are largely carried by operating portions of the instrument conventionally provided. In this connection it may be mentioned that in these embodiments the break in each modifying circuit produced by the switches 85 is not required for electrical purposes, but performs the highly useful function of permitting the removal from the rest of the instrument, without complicated electrical disconnections, of the keys 8 with their extensions 9, the action mechanisms 11, the hammers 7, etc., which portions are conventionally made in the form of a removable action unit. In the embodiment of Figure 5, however, the normalizing and modifying circuits are not carried by operating portions of the instrument, but may be incorporated in a separate unit which is assembled into operative relation with the conventional instrument. It will be seen in that figure that the various elements shown impregnated in the earlier figures are herein unimpregnated, and that lug 67 and conductive top portion 84 of hammer flange rail 83 have been omitted as being unnecessary. The reactive system 89—88—87 of Figure 3 has been employed with each string.

The normalizing and modifying circuit for each string are again provided with a co-extensive portion, in this instance optionally including the resistance 90b; and definitely including a flat spring member 107 connected to the reactive system, through the resistance 90b if employed.

The balance of each of the several normalizing circuits includes a portion of a common felt or leather strip 103 secured to the top of a common conductive member or plate 101; the plate 101 and strip 103 being disposed above the strings and dampers, and running in a direction transverse to that of the strings and thus appearing in Figure 5 in section. The strip 103 is impregnated with the graphite solution or emulsion, the impregnation preferably extending interiorly of the strip as above described for the damping pad 12a of Figure 1; and against this strip normally bear the several spring members 107. These members may be terminally secured to insulating strip 108 and this in turn to plate 101 in such manner that an individual spring member 107 is disposed over each damper 13. The plate 101 is electrically connected to potentiometer contact 63; and thus the normalizing circuit for each string may be traced through a resistance 90b, through a spring member 107, through the vertical transverse resistance of the portion of common impregnated strip 103 beneath that spring, and through the plate 101 to the potential source.

The balance of the modifying circuit for each string is provided by positioning above the common impregnated strip 103, and on the opposite side of the spring members 107 therefrom, a second common impregnated strip 104. This may be secured to the bottom of a common conductive bar 105, which in turn may be insulatively mounted to common plate 101 in any convenient manner. The common bar 105 is electrically connected to the potentiometer contact 64. If and when the forward extremity of a spring member 107 is raised so that the spring member contacts with the impregnated strip 104 there is closed the associated modifying circuit, which may then be traced through a resistance 90b, through a spring member 107, through the vertical transverse resistance of the portion of common impregnated strip 104 above that member, and through the bar 105 to the potential source.

For raising the spring member 107 disposed immediately thereabove from out of the contact with strip 103 and into contact with strip 104, each damper 13 is provided at its top with a hex-headed screw 106. This is adjusted so that with the associated key 8 fully depressed the screw 106 causes the associated spring member 107 just dependably to contact with the bottom of strip 104; and the spacing between the bar 105 and the plate 101 is in general such that when the associated key is fully released the top of screw 106 is but negligibly out of contact with the bottom of the associated spring member 107. It is contemplated that the sustaining pedal system will be adjusted, as by collar 24a, so that the thereby produceable raising of the dampers 13 will be insufficient to cause contact of any spring member 107 with the impregnated strip 104, though of course sufficient to lift all the dampers from out of contact with the strings and all the spring members 107 from out of contact with strip 103. It is further contemplated that the sostenuto pedal system will be adjusted, as by collar 29a, so that the thereby produceable raising of a damper 13 above the position corresponding to full key depression will be limited to an amount permitted by the flexing of the associated spring member 107 and by the compression of the portion of strip 104 immediately thereabove.

The circuit of Figure 5, condensed as have been those of preceding figures, is presented in Figure 6. Herein appears a reactive system 89—88—87; a resistance 90b and spring member 107 forming a co-extensive portion for mutually associated normalizing and modifying circuits; the balance of a normalizing circuit schematically shown as a contact 103″ representing the top surface of common strip 103, and a resistance 103′ representing the transverse resistance of the strip portion opposite a spring member 107; and the balance of a modifying circuit schematically shown as a contact 104″, representing the bottom surface of common strip 104, and a resistance 104′ representing the transverse resistance of the strip portion opposite a spring member 107. It is particularly obvious from this figure that each spring member 107 forms the pole of a single-pole double-throw switch normally biased to one (the lower) of its two throw adjustments, and movable (by the damper) to its other throw adjustment or to an intermediate adjustment.

As before, with the key 8 associated with a given string 5 in a normal or raised position, the normalizing circuit associated with that string is closed, the associated modifying circuit open, and the string at its normal potential. During a downward movement of key 8 the associated spring member 107 is raised from out of contact with the strip 103, opening the normalizing circuit. The modifying circuit is not closed, however, until that spring member 107 contacts with strip 104. This will be understood to occur just at the completion of key depression. In contrast to the operation in the embodiments of Figures 1 and 3, the closing of the modifying circuit is not as positively delayed beyond the instant of impact of hammer with string, but it is sufficiently late so that the associated string is still at least substantially at its normal potential at the instant of hammer impact. When the modifying circuit is closed the string as before assumes the modified potential gradually, rather that abruptly, because of the reactive system 89—88—87 and the resistance 104′—90b of the modifying circuit.

Again as long as a key remains depressed, and in this embodiment also as long as the associated damper is maintained raised by the sostenuto pedal 26 whether or not the key be maintained depressed, the associated normalizing circuit remains open and the associated modifying circuit closed, and the associated string is positively influenced to retain its modified potential.

During the first portion of the upward motion of the key attendant upon key release the modifying circuit is opened; but the normalizing circuit is still in an open condition, and as long as this condition exists the string retains its modified potential. This condition may be maintained at will by the appropriate use of the sustaining pedal 21, which will of course maintain all spring members 107 out of contact with the strip 103. When a spring member 107 contacts with the strip 103, whether upon the completion of key release or of a pedal operation, the normalizing circuit for the associated string is closed and the string gradually rather than abruptly, assumes the normal potential.

Typical, but not restrictive, appropriate values of the circuit components for Figure 5 may be assigned as 1 to 2 megohms for the total value of 104′ and 90b, serially considered; ½ to 1 megohm for the total value of 103′ and 90b; 1 to 2 megohms for the value of 88; and .01 to .02 microfarad for the value of each of condensers 87 and 89. These values are analogous to those assigned above for analogous components of Figure 3; and the resistance 90b, analogous to the resistance 90 of that figure, may be optionally omitted as in that case if desired.

It is obvious from the descriptions of the several embodiments that either the sustaining pedal 21 or the sostenuto pedal 26 when appropriately depressed will prevent the closing, upon key release or up-stroke, of the switch formed by the respective conductive damping pad 12a and its string 5 in Figure 1, of the switch formed by the respective surface 69 and its contact member 91 in Figure 3, or of the switch formed by the respective spring 107 and the strip 103 in Figure 5.

In each of Figures 1, 2, 3, and 5 the contact 63, to which all the normalizing circuits are connected, has been shown adjusted to the grounded extremity of potentiometer 62; and the contact 64, to which all the modifying circuits are connected, has been shown adjusted to the opposite extremity of the potentiometer. Thus the normal potential of each string with respect to ground is zero and the modified potential is the maximum of the battery 61. The normal translation efficiency is therefore zero and the modified efficiency finite; the instrument is therefore adjusted to produce an output tone whose inception is of gradually rising amplitude. These relative values of potentials, or of efficiencies, are exemplary only; and there have been illustrated in Figures 4 and 6 other typical adjustments of these contacts producing other relative potential or efficiency values.

In Figure 4 the two contacts 63 and 64 have both been shown adjusted to the ungrounded extremity of the potentiometer 62. Under such conditions the normal and modified potentials, or translation efficiencies, are of finite value and mutually identical; no influence operates at any time on the string to modify this value of potential, or of the translation efficiency. The amplitude characteristics of the output tones of the instrument are therefore unmodified from those of the vibrations from which they are translated; and with the illustrated percussion excitation of the strings a generally piano-like tone will therefore be produced.

In Figure 6 the contact 63 has been shown adjusted to the ungrounded extremity of the potentiometer 62 and the contact 64 to an intermediate point thereon. Thus the normal potential of each string with respect to ground is the maximum of the battery 61 and the modified potential is a fractional part of this maximum potential. The normal translation efficiency is therefore of a finite value, and the modified efficiency is a fractional part of such value. The output tones of the instrument will then be characterized by an early gradual amplitude reduction superimposed on any which may be inherent in the vibrations from which they are translated. In this case it will be obvious that with an adjustment of the contact 64 to the grounded extremity of the potentiometer 62 this early amplitude reduction will extend to a substantially complete elimination of the tone at a fixed short time after its inception, producing an apparent extreme rate of decay.

Thus the adjustment of the contacts or of equivalent switches may serve to control the dynamic characteristics of the tones; and by virtue of the improved circuit arrangements herein disclosed the sustaining and sostenuto pedals 21 and 26 will have a rational action under any of these possible adjustments.

It will be understood that there is intended no limitation of the invention by virtue of the specific details of the illustrated embodiments thereof, and that the scope of the invention is intended to be expressed in the following claims.

We claim:

1. The combination with a piano including a key, a pedal, and a string arranged for vibration upon and during key operation and for continuance of vibration during continued pedal operation after key release: of a translating system, normally possessing a given efficiency, for translating the vibrations of said string into electric oscillations; and means for causing said translating system to possess a different efficiency, said last mentioned means being responsive both to operation of said key and to said continued pedal operation.

2. The combination with a musical instrument including primary vibration control means, secondary vibration control means, and a vibrator arranged for vibration upon and during operation of said primary means and for continuance of vibration during continued operation of said secondary means after release of said primary means: of a translating system, normally possessing a given efficiency, for translating the vibrations of said vibrator into sound; and means for causing said translating system to possess a different efficiency, said last mentioned means being responsive both to operation of said primary means and to said continued secondary means operation.

3. The combination with a musical instrument including primary control means, secondary control means, and a mechanical source of oscillations arranged to function upon and during operation of said primary means and for continuance of functioning during continued operation of said secondary means after release of said primary means of a system, normally possessing a given efficiency, for translating sound from said source; and means for causing said translating system to possess a different efficiency, said last mentioned means being responsive both to operation of said primary means and to said continued secondary means operation.

4. In combination in a musical instrument, a vibrator; means normally characterized by given efficiency for translating vibration thereof into sound; a key operable at will to produce vibration of said vibrator; means responsive to key operation for investing said translating means with a modified efficiency; and means operable at will, and influencing jointly said vibrator and said translating means, for continuing said vibration and said modified efficiency after release of said key.

5. In combination in a musical instrument, a vibrator; vibration governing means therefor; means for translating vibration thereof into sound; and a pair of means for investing said translating means with respectively different efficiencies, said two means being associated with said vibration governing means for discontinuous, alternate operation, and said translating means being arranged to retain each of said efficiencies until investment thereof with the other of said efficiencies.

6. In combination in a musical instrument, a mechanical source of oscillations; means for governing the operation thereof; means for translating sound from said source; and a pair of means for investing said translating means with respectively different efficiencies, said two means being associated with said governing means for discontinuous, alternate operation, and said translating means being arranged to retain each of said efficiencies until investment thereof with the other of said efficiencies.

7. In combination in a musical instrument, a vibrator; vibration governing means therefor; and a pair of means for applying two different potentials to said vibrator, said two means being associated with said vibration governing means for discontinuous, alternate operation, and said vibrator being arranged to retain each of said two potentials thereto applied until application thereto of the other of said potentials.

8. The combination with a piano including a string, means for translating vibrations thereof into sound, vibration governing means therefor including a damper portion normally resting thereon, a key depressible to raise said damper, and a pedal depressible to maintain said damper raised; of means associated with said vibration governing means and with said damper portion thereof for controlling the translation efficiency of said translating means, said controlling means being responsive to both said key and said pedal.

9. In combination in a musical instrument, vibrator; means operable at will to initiate vibration thereof and means operable at will to terminate such vibration; means normally characterized by an efficiency of given value for translating such vibration into sound; means for changing said efficiency to a modified value upon operation of said vibration initiating means; and means associated with said vibration terminating means, and operative only upon operation thereof, for restoring said efficiency to said given value.

10. In combination in a musical instrument, a vibrator; means operable at will to initiate vibration thereof and means operable at will to terminate such vibration; means normally characterized by an efficiency of given value for translating such vibration into sound; means for changing said efficiency to a modified value upon operation of said vibration initiating means; means associated with said vibration terminating means, and operative only upon operation thereof, for restoring said efficiency to said given value; and means for rendering gradual each change of said efficiency.

11. In combination in a musical instrument, a vibrator and means for translating vibration thereof into sound, said means being arranged to retain a value of translation efficiency once assumed thereby until positively influenced to assume another value of efficiency; means operable at will to initiate vibration of said vibrator and means operable at will to suppress such vibration; means associated with said last mentioned means, and operative only throughout the operation thereof, for positively influencing said translating means to assume a normal value of efficiency; and means operative upon operation of said vibration initiating means for positively influencing said translating means to assume a modified value of efficiency.

12. In combination in a musical instrument, a vibrator and means for translating vibration thereof into sound, said means being arranged to retain a value of translation efficiency once assumed thereby until positively influenced to assume another value of efficiency; means operable at will to initiate vibration of said vibrator and means operable at will to suppress such vibration; means associated with said last mentioned means, and operative only throughout the operation thereof, for positively influencing said translating means to assume a normal value of efficiency; means operative upon operation of said vibration initiating means for positively influencing said translating means to assume a modified value of efficiency; and means for rendering gradual each change of value of said efficiency.

13. The combination with a musical instrument including a vibrator adapted to retain a potential assumed thereby until the application thereto of a different potential, and vibration-sound translating means therefor having an efficiency responsive to the potential of said vibrator; of a damper normally resting on said vibrator; a key depressible to raise said damper and to excite said vibrator; and means for controlling the potential of said vibrator, comprising means associated with said damper, and operative only throughout substantial contact thereof with said vibrator, for applying a normal potential to said vibrator, and means operative while said key is depressed for applying a modified potential to said vibrator.

14. The combination claimed in claim 13, further including a reactive system interposed between said vibrator and both said last-mentioned two means, for rendering gradual each change of potential of said vibrator.

15. The combination claimed in claim 13, further including a pedal depressible to maintain said damper raised, whereby to maintain said vibrator at said modified potential after release of said key.

16. In combination in a musical instrument, a vibrator; a vibration-sound translating means therefor; a damper normally resting on said vibrator; a key depressible to excite said vibrator and to raise said damper; a double-throw switch associated with said damper, having a pole biased to a first throw adjustment and adapted to be moved by raising of said damper to a second throw adjustment; and means respectively responsive to said two throw adjustments for establishing respectively different efficiencies of said translating means.

17. The combination with a piano including a plurality of strings lying substantially in a plane, a plurality of dampers respectively resting on said strings, a plurality of keys respectively adapted to raise said dampers and to initiate vibrations of said strings, and translating means associated with each string for translating vibrations thereof into electric oscillations; of electric circuits for controlling the efficiency of the translating means associated with each string, said circuits including a first common conductive means disposed substantially above said dampers; a second common conductive means disposed above, and in spaced relation to, said first conductive means; and a plurality of spring members normally biased to contact with said first conductive means and respectively adapted to be raised by said dampers out of contact with said first conductive means and into contact with said second conductive means.

18. In a piano including a string, translating means associated therewith, and an electric circuit controlling said translating means: piano portions in fixed relation to the extremity of said string; a lever pivoted to said fixed portions; a damper connected to said lever for movement thereby and normally resting on said string; a removable mechanism adapted to occupy a predetermined position relative to said fixed portions, and including a key and a member adapted upon key depression to impinge upon and move said lever and two electric circuit portions respectively associated with said mechanism and with said fixed piano portions, and respectively including conductive means on said member and on said lever, said two circuit portions being mutually connected through said two conductive means during key depression when said mechanism occupies said predetermined position.

19. In a piano including a string, translating means associated therewith, and an electric circuit controlling said translating means: a damper; a conductive portion included in said damper and normally resting on said string; means for raising said damper and conductive portion from said string and for vibrating said string; and electric circuit control means including a switch formed mutually by said conductive damper portion and said string.

20. In a piano including a string, translating means associated therewith, and an electric circuit controlling said translating means: a damper normally resting on said string; means for raising said damper from said string and for vibrating said string; and electric circuit control means including a resiliently supported conductive member, and further including conductive means connected to said damper for movement therewith and arranged to be in contact with said member when said damper rests on said string and to be out of contact with said member when said damper is raised from said string.

21. In an electrical musical instrument capable of simulating the musical performance of a piano, a key, an electrical switch operated by said key, a sustaining pedal, means coacting with said switch and operated by said pedal for mechanically preventing the operation of said switch during the up-stroke of said key.

22. In a musical instrument having for an individual note an element the electrical potential of which effects a control of the intensity with which that note will be sounded, a key; means operated by said key in its down-stroke for changing the potential of said element from a normal value; means operated incident to the up-stroke of said key for restoring the potential of said element to said normal value; a pedal operable at will; and means, coacting with said restoring means and operated by said pedal, for preventing the operation of said restoring means while said pedal remains operated after the up-stroke of said key.

23. In a musical instrument having for an individual note a condenser the electrical charge in which effects a control of the intensity with which that note will be sounded, a key; means operated by said key in its down-stroke for changing the charge in said condenser from a normal value; means operated incident to the up-stroke of said key for restoring the charge in said condenser to said normal value; a pedal operable at will; and means, coacting with said restoring means and operated by said pedal, for preventing the operation of said restoring means while said pedal remains operated after the up-stroke of said key.

BENJAMIN F. MIESSNER.
CHARLES T. JACOBS.